(12) United States Patent
Takahashi et al.

(10) Patent No.: US 8,961,078 B2
(45) Date of Patent: Feb. 24, 2015

(54) ROTARY CUTTING TOOL

(71) Applicant: Union Tool Co., Shinagawa, Tokyo (JP)

(72) Inventors: Shoichi Takahashi, Shinagawa-ku (JP); Masanori Kakuda, Shinagawa-ku (JP)

(73) Assignee: Union Tool Co., Tokyo (JP)

( * ) Notice: Subject to any disclaimer, the term of this patent is extended or adjusted under 35 U.S.C. 154(b) by 276 days.

(21) Appl. No.: 13/687,834

(22) Filed: Nov. 28, 2012

(65) Prior Publication Data
US 2013/0136548 A1   May 30, 2013

(30) Foreign Application Priority Data
Nov. 29, 2011   (JP) .................................. 2011-260295

(51) Int. Cl.
*B23C 5/10* (2006.01)
*B23C 5/16* (2006.01)
*B23C 5/28* (2006.01)

(52) U.S. Cl.
CPC . *B23C 5/165* (2013.01); *B23C 5/10* (2013.01); *B23C 2210/0414* (2013.01); *B23C 2226/27* (2013.01)
USPC .............................................. 407/53; 407/54

(58) Field of Classification Search
CPC ............ B23C 5/10; B23C 5/06; B23C 5/165; B23C 2210/088; B23C 2210/326; B23C 2226/27; B23B 51/08
USPC ........................... 407/53, 54, 59, 63; 408/230
See application file for complete search history.

(56) References Cited

U.S. PATENT DOCUMENTS 3,704,517 A * 12/1972 Deterling .......................... 408/26
3,863,316 A *  2/1975 Yeo .................................. 407/54
(Continued)

FOREIGN PATENT DOCUMENTS

JP         2002-018629 A     1/2002

OTHER PUBLICATIONS

Extended European Search Report issued in European Application No. 12194638.8 dated Feb. 22, 2013.

*Primary Examiner* — Will Fridie, Jr.
(74) *Attorney, Agent, or Firm* — Sughrue Mion, PLLC (57) ABSTRACT

To provide a rotary cutting tool in which a satisfactory cut state in which burrs and uncut portions are absent is obtained, even when counterboring is applied to a composite honeycomb member. A first cutting-chip discharge groove (2) disposed from a tool tip towards a base-end side is formed on an outer periphery of a tool body (1); a plurality of second cutting-chip discharge grooves (3), provided along a spiral disposed from the tool tip towards the base-end side so as to intersect with the first cutting-chip discharge groove (2), are formed on an outer periphery section of the tool body (1) where the first cutting-chip discharge groove (2) is absent; and a base-end-side outer periphery cutting edge (4) is formed on an intersection ridge between a rake face of a second cutting-chip discharge groove (3), which faces a direction of tool rotation, and an outer peripheral surface of the tool body (1) or an outer peripheral relief face; wherein an end cutting edge (5) is provided at a tip section of the tool body (1); a tip-side outer periphery cutting edge (6) is formed on an intersection ridge between the rake face at a tip section of a first cutting-chip discharge groove (2) and an outer peripheral surface of the tip section of the tool body (1) or an outer periphery relief face (18); and the base-end-side outer periphery cutting edge (4) is provided further towards the tool base-end side than the tip-side outer periphery cutting edge (6).

18 Claims, 5 Drawing Sheets

(56) References Cited

U.S. PATENT DOCUMENTS

| | | | |
|---|---|---|---|
| 3,913,196 A * | 10/1975 | Maday | 407/54 |
| 4,395,167 A | 7/1983 | Maternus | |
| 4,475,850 A * | 10/1984 | Penoza et al. | 407/54 |
| 4,480,949 A * | 11/1984 | Van De Bogart | 407/54 |
| 5,221,163 A * | 6/1993 | Nishimura | 407/53 |
| 6,007,276 A * | 12/1999 | Wardell | 407/54 |

* cited by examiner

(a) EXAMPLE IN WHICH OUTER PERIPHERY CUTTING EDGES ARE FORMED ON INTERSECTION RIDGES BETWEEN OUTER PERIPHERY RELIEF FACES AND RAKE FACES OF CUTTING-CHIP DISCHARGE GROOVES (b) EXAMPLE IN WHICH OUTER PERIPHERY CUTTING EDGES ARE FORMED ON INTERSECTION RIDGES BETWEEN OUTER PERIPHERY RELIEF FACES AND RAKE FACES OF CUTTING-CHIP DISCHARGE GROOVES (c) EXAMPLE IN WHICH OUTER PERIPHERY CUTTING EDGES ARE FORMED ON INTERSECTION RIDGES BETWEEN OUTER PERIPHERAL SURFACE (CYLINDRICAL SURFACE) AND RAKE FACES OF CUTTING-CHIP DISCHARGE GROOVES

FIG. 6

| | BASE-END-SIDE OUTER PERIPHERY CUTTING EDGES(SECOND CUTTING-CHIP DISCHARGE GROOVES) | | | FIRST CUTTING-CHIP DISCHARGE GROOVES | | | | NUMBER OF END CUTTING EDGES | TIP-SIDE OUTER PERIPHERY CUTTING EDGES | EVALUATION USING MATERIAL TO BE CUT (OUT OF 5; PASS MARK IS 3) | | |
|---|---|---|---|---|---|---|---|---|---|---|---|---|
| | SPIRAL ANGLE | | NUMBER | NUMBER OF EFFECTIVE TEETH | SPIRAL ANGLE | | NUMBER | REMOVAL OCCUPANCY ANGLE | | | CUTTING PERFORMANCE FOR HONEYCOMB CORE | CUTTING PERFORMANCE FOR CFRP MATERIAL | CUTTING PERFORMANCE FOR SURFACE MATERIAL |
| FIRST COMPARATIVE EXAMPLE | LEFT | 10° | 6 | 6 | NONE | NONE | NONE | NONE | 2 | NONE | ○3 | ◎5 | ×1 |
| SECOND COMPARATIVE EXAMPLE | LEFT | 40° | 6 | 6 | NONE | NONE | NONE | NONE | 2 | NONE | ○3~4 | ◎4~5 | ×1 |
| THIRD COMPARATIVE EXAMPLE | LEFT | 75° | 4 | 2~4 | LEFT | 1° | 2 | 47° | 2 | NONE | △2.5 | ○3.5 | ◎4 (NO BURRS) |
| FOURTH COMPARATIVE EXAMPLE | LEFT | 80° | 2 | 1~2 | RIGHT | 10° | 3 | 47° | 3 | 1.2mm | ◎4.5 | ○3 | △2.5 |
| FIRST EXPERIMENTAL EXAMPLE | LEFT | 75° | 4 | 3~4 | LEFT | 0° | 1 | 85° | 1 | 1.2mm | ◎3.5~4 | ◎4 | ◎4.5 (NO BURRS) |
| SECOND EXPERIMENTAL EXAMPLE | LEFT | 75° | 4 | 2~4 | LEFT | 0° | 2 | 85° | 2 | 1.2mm | ◎3.5~4 | ◎4 | ◎4.5 (NO BURRS) |
| THIRD EXPERIMENTAL EXAMPLE | LEFT | 75° | 4 | 3~4 | LEFT | 1° | 1 | 85° | 1 | 1.2mm | ◎3.5~4 | ◎4 | ◎4.5 (NO BURRS) |
| FOURTH EXPERIMENTAL EXAMPLE | LEFT | 75° | 4 | 2~4 | LEFT | 1° | 2 | 85° | 2 | 1.2mm | ◎3.5~4 | ◎4 | ◎4.5 (NO BURRS) |
| FIFTH EXPERIMENTAL EXAMPLE | LEFT | 75° | 4 | 3~4 | LEFT | 10° | 1 | 85° | 1 | 1.2mm | ◎3.5~4 | ◎4 | ◎4.5 (NO BURRS) |
| SIXTH EXPERIMENTAL EXAMPLE | LEFT | 75° | 4 | 2~4 | LEFT | 10° | 2 | 85° | 2 | 1.2mm | ◎4.5 | ◎4 | ◎4.5 (NO BURRS) |
| SEVENTH EXPERIMENTAL EXAMPLE | LEFT | 80° | 2 | 1~2 | LEFT | 10° | 3 | 47° | 3 | 1.2mm | ◎4.5 | ○3 | ◎4 (NO BURRS) | ved
ROTARY CUTTING TOOL

BACKGROUND OF THE INVENTION

1. Field of the Invention

The present invention relates to a rotary cutting tool for cutting a material to be cut including a honeycomb core such as a composite honeycomb member (honeycomb sandwich panel).

2. Description of the Related Art

A composite honeycomb member is obtained by layering a fiber-reinforced plastic body on upper and lower surfaces of a honeycomb core, which is a planar assembly of hollow columnar cells, and further providing, on surfaces, a resin film or another surface material. A composite honeycomb member is light and exhibits excellent strength.

An end mill, such as that shown, e.g., in Patent Citation 1, is used to machine a composite honeycomb member into a predetermined shape.

However, in an instance in which "counterboring" is performed, where cut-machining is performed from one surface of a substrate and a recess (groove) having a predetermined depth is formed, it is extremely difficult to obtain a satisfactory cut state in which burrs and uncut portions are absent in all of the honeycomb core, the fiber-reinforced plastic body, and the surface material. Therefore, additional processes such as removal of uncut portions or burr removal are necessary.

Patent Citation 1: JP patent unexamined publication No. 2002-18629

SUMMARY OF THE INVENTION

In the light of the circumstances described above, the present invention was contrived based on the discovery that, as a result of a variety of repeated experiments, a configuration in which all of a honeycomb core, a fiber-reinforced plastic body, and a surface material can be cut in a satisfactory manner when the above-mentioned counterboring is applied. The present invention provides an extremely practical rotary cutting tool in which it is possible to obtain a satisfactory cut state in which uncut portions and burrs are absent in all of the honeycomb core, the fiber-reinforced plastic body, and the surface material even when counterboring is applied to a composite honeycomb member.

An outline of the present invention will now be described with reference to the accompanying drawings.

The present invention relates to a rotary cutting tool in which: a first cutting-chip discharge groove 2 disposed from a tool tip towards a base-end side is formed on an outer periphery of a tool body 1; a plurality of second cutting-chip discharge grooves 3, provided along a spiral disposed from the tool tip towards the base-end side so as to intersect with the first cutting-chip discharge groove 2, are formed on an outer periphery section of the tool body 1 where the first cutting-chip discharge groove 2 is absent; a base-end-side outer periphery cutting edge 4 is formed on an intersection ridge between a rake face of a second cutting-chip discharge groove 3, which faces a direction of tool rotation, and an outer peripheral surface of the tool body 1 or an outer peripheral relief face formed on the outer periphery of the tool body 1; wherein an end cutting edge 5 is provided at a tip section of the tool body 1; a tip-side outer periphery cutting edge 6 is formed on an intersection ridge between the rake face at a tip section of the first cutting-chip discharge groove 2 and an outer peripheral surface of the tip section of the tool body 1 or an outer periphery relief face 18 formed on an outer periphery of the tip section of the tool body 1; and the base-end-side outer periphery cutting edge 4 is provided further towards the tool base-end side than the tip-side outer periphery cutting edge 6.

The present invention also relates to a rotary cutting tool according to the first aspect, characterized in that: the first cutting-chip discharge groove 2 is provided as a straight line, or a leftward spiral having a spiral angle that is smaller than [the spiral angle of the second cutting-chip discharge grooves 3-10°], disposed from the tool tip to the base-end side; the second cutting-chip discharge grooves 3 are provided as a leftward spiral; and the spiral angle of the second cutting-chip discharge grooves 3 is set to at least 50° and less than 90°.

The present invention also relates to the rotary cutting tool according to the first aspect, characterized in that the base-end-side outer periphery cutting edge 4 and the tip-side outer periphery cutting edge 6 have a substantially uniform diameter from the tip to the base end.

The present invention also relates to the rotary cutting tool according to the second aspect, characterized in that the base-end-side outer periphery cutting edge 4 and the tip-side outer periphery cutting edge 6 have a substantially uniform diameter from the tip to the base end.

The present invention also relates to the rotary cutting tool according to the fourth aspects, characterized in that: the occupancy angle of the first cutting-chip discharge groove 2 in cross-section perpendicular to a tool axis is equal to or greater than 15° and smaller than [360/the number of second cutting-chip discharge grooves 3 present]; and the base-end-side outer periphery cutting edge 4 is provided so that the number of effective teeth at an arbitrary point in a direction of tool axis is no less than [the number of the second cutting-chip discharge grooves 3–the number of the first cutting-chip discharge groove 2].

The present invention also relates to the rotary cutting tool according to the fifth aspect, characterized in that the end cutting edge 5 and the tip-side outer periphery cutting edge 6 are provided in equal numbers, and each of the end cutting edge 5 and the tip-side outer periphery cutting edge 6 is provided in continuation.

The present invention also relates to the rotary cutting tool according to the sixth aspect, characterized in that the first cutting-chip discharge groove 2 is provided in continuation with the end cutting edge 5 and the tip-side outer periphery cutting edge 6.

The present invention also relates to the rotary cutting tool according to the sixth aspect, characterized in that the base-end-side outer periphery cutting edge 4 is provided so that the number of effective teeth at an arbitrary point in the direction of tool axis is no less than [the number of the second cutting-chip discharge grooves 3–the number of the first cutting-chip discharge groove 2].

The present invention also relates to the rotary cutting tool according to the seventh aspect, characterized in that the base-end-side outer periphery cutting edge 4 is provided so that the number of effective teeth at an arbitrary point in the direction of tool axis is no less than [the number of the second cutting-chip discharge grooves 3–the number of the first cutting-chip discharge groove 2].

The present invention also relates to the rotary cutting tool according to any of the first aspect, characterized in that the number of the base-end-side outer periphery cutting edges 4 is greater than the number of the tip-side outer periphery cutting edges 6.

The present invention also relates to the rotary cutting tool according to the second aspect, characterized in that the number of the base-end-side outer periphery cutting edges 4 is greater than the number of the tip-side outer periphery cutting edges 6.

The present invention also relates to the rotary cutting tool according to the third aspect, characterized in that the number of the base-end-side outer periphery cutting edges 4 is greater than the number of the tip-side outer periphery cutting edges 6.

The present invention also relates to the rotary cutting tool according to the fourth aspect, characterized in that the number of the base-end-side outer periphery cutting edges 4 is greater than the number of the tip-side outer periphery cutting edges 6.

The present invention also relates to the rotary cutting tool according to the fifth aspect, characterized in that the number of the base-end-side outer periphery cutting edges 4 is greater than the number of the tip-side outer periphery cutting edges 6.

The present invention also relates to the rotary cutting tool according to the sixth aspect, characterized in that the number of the base-end-side outer periphery cutting edges 4 is greater than the number of the tip-side outer periphery cutting edges 6.

The present invention also relates to the rotary cutting tool according to the seventh aspect, characterized in that the number of the base-end-side outer periphery cutting edges 4 is greater than the number of the tip-side outer periphery cutting edges 6.

The present invention also relates to the rotary cutting tool according to the eighth aspect, characterized in that the number of the base-end-side outer periphery cutting edges 4 is greater than the number of the tip-side outer periphery cutting edges 6.

The present invention also relates to the rotary cutting tool according to the ninth aspect, characterized in that the number of the base-end-side outer periphery cutting edges 4 is greater than the number of the tip-side outer periphery cutting edges 6.

Since the present invention is configured as described above, the present invention is a rotary cutting tool having excellent utility, in which even when counterboring is applied to a complex honeycomb member, it is possible to obtain a satisfactory cutting state in which burrs and uncut portions are absent in all of the honeycomb core, the fiber-reinforced plastic body, and the surface material.

DESCRIPTION OF THE PREFERRED EMBODIMENTS

A preferred embodiment of the present invention will now be briefly described with reference to the accompanying drawings, indicating the operation of the present invention.

When counterboring is applied to a composite honeycomb member obtained by layering a fiber-reinforced plastic body on upper and lower surfaces of a honeycomb core and further providing a resin film or another surface material on surfaces, the tip-side outer periphery cutting edges 6 and the end cutting edges 5 provided to the tool tip can be used to cut, in a satisfactory manner, the cells of the honeycomb core, and the base-end-side outer periphery cutting edges 4 provided close to each other along a spiral (having a large spiral angle) disposed from the tool tip to the base-end side so as to intersect the first cutting-chip discharge grooves 2 can be used to cut, in a satisfactory manner, the fiber-reinforced plastic body and the surface material. Therefore, it is possible to obtain a satisfactory cutting state in which burrs and uncut portions are absent in all of the honeycomb core, the fiber-reinforced plastic body, and the surface material.

EXAMPLE

A specific example of the present invention will now be described with reference to the accompanying drawings.

The present example is a rotary cutting tool in which: a first cutting-chip discharge groove 2 disposed from a tool tip towards a base-end side is formed on an outer periphery of a tool body 1; a plurality of second cutting-chip discharge grooves 3, provided along a spiral disposed from the tool tip towards the base-end side so as to intersect with the first cutting-chip discharge groove 2, are formed on an outer periphery section of the tool body 1 where the first cutting-chip discharge groove 2 is absent; and a base-end-side outer periphery cutting edge 4 is formed on an intersection ridge between a rake face of a second cutting-chip discharge groove 3, which faces a direction of tool rotation, and an outer peripheral surface of the tool body 1 or an outer peripheral relief face formed on the outer periphery of the tool body 1; wherein an end cutting edge 5 is provided at a tip section of the tool body 1; a tip-side outer periphery cutting edge 6 is formed on an intersection ridge between the rake face at a tip section of a first cutting-chip discharge groove 2 and an outer peripheral surface of the tip of the tool body 1 or an outer periphery relief face 18 formed on an outer periphery of the tip of the tool body 1; and the base-end-side outer periphery cutting edge 4 is provided further towards the tool base-end side than the tip-side outer periphery cutting edge 6. The difference between the "outer peripheral surface" and the "outer periphery relief face formed on the outer periphery" shall be described further below.

Figure 3:
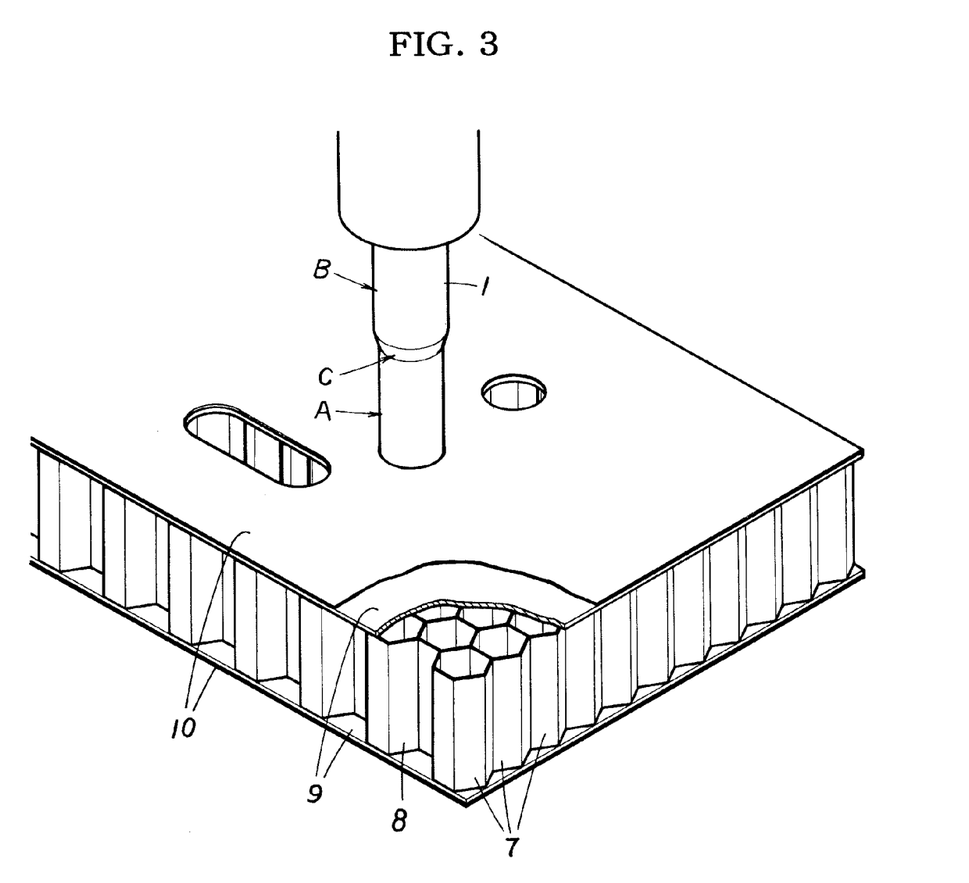
FIG. 3 illustrates a mode of application of the present example.

Specifically, as illustrated in FIG. 3, the present example is an end mill comprising a cutting edge section A, a shank section B, and a tapered section C linking the cutting edge section and the shank section. The end mill is primarily used to apply "counterboring" on a composite honeycomb member obtained by layering a carbon-fiber-reinforced plastic body (CFRP 9) on upper and lower surfaces of a paper honeycomb core 8, which is a planar assembly of hollow columnar (hollow hexagonal columnar) cells 7, and further providing a resin film 10 as a surface material on surfaces.

Specifically, when counterboring is performed on the composite honeycomb member, the tip side of the cutting section A primarily cuts the cells 7 and the base-end side of the cutting edge section A primarily cuts the fiber-reinforced plastic body and the surface material. In the present example, each of the constituent features is set so that all of the materials are cut in a satisfactory manner. A more specific description of the cutting edge section A will now be given.

Figure 1:
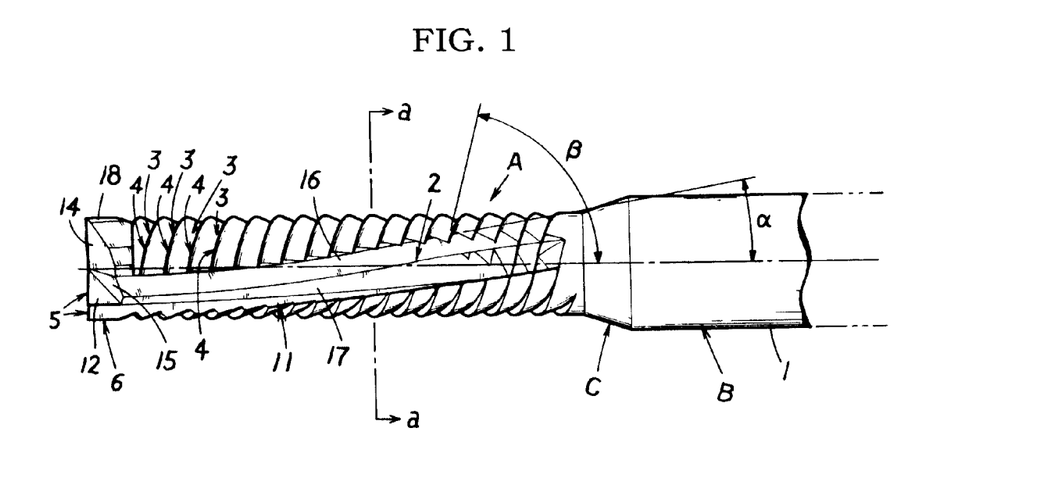
FIG. 1 is a schematic illustrative side view of a present example.
Figure 2:
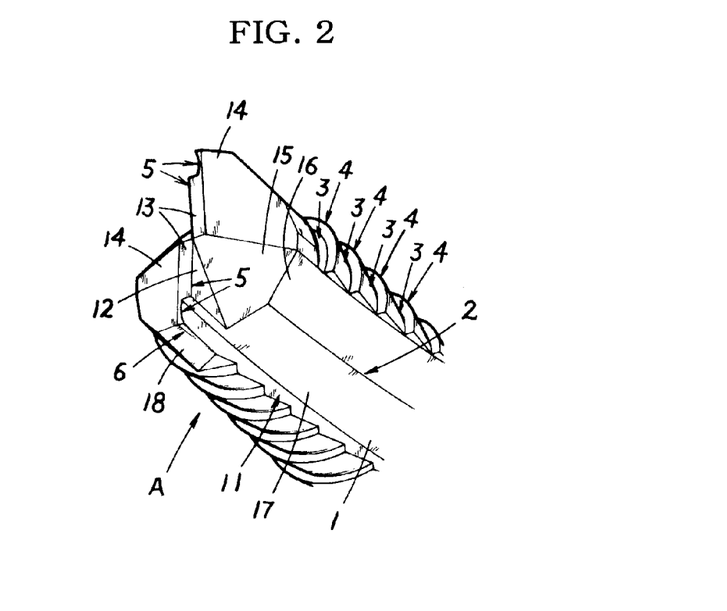
FIG. 2 is a schematic illustrative perspective view of the tip section of the present example.

As shown in FIGS. 1 and 2, two first cutting-chip discharge grooves 2, shaped as a spiral disposed from the tool tip towards the base-end side, are formed on the outer periphery of the tool body 1 so that a predetermined spacing is present therebetween; four second cutting-chip discharge grooves 3, provided along a spiral having a greater spiral angle than that of the first cutting-chip discharge grooves 2, are formed on the outer periphery section, between the first cutting-chip discharge grooves 2, on the outer periphery of the tool body 1; and base-end-side outer periphery cutting edges 4 are formed on intersection ridges between rake faces of the second cutting-chip discharge grooves 3, which face the direction of tool rotation, and outer periphery relief faces formed on the outer periphery of the tool body 1.

An end cutting edge 5 having a cutting edge is provided to each intersection ridge between rake faces 11 of the two first cutting-chip discharge grooves 2 and a first tip relief face 13 of the tool body 1 and between a gash face 12 provided on the tool-tip side and the first tip relief face 13 of the tool body 1. In the drawing, numeral 14 represents a second tip relief face; 15 represents a gash continuation face, which is in continuation with the gash face 12; 16 represents a first bottom surface of the first cutting-chip discharge grooves 2; and 17 represents a second bottom surface of the first cutting-chip discharge grooves 2. The first cutting-chip discharge grooves 2 may also be provided in a straight line, and the number of the first cutting-chip discharge grooves 2 provided may also be one or three or more.

In the present example, a tip-side outer periphery cutting edge 6 is provided to each intersection ridge between a rake face at the tip section of each of the first cutting-chip discharge grooves 2 and an outer periphery relief face 18 formed on the outer periphery at the tip of the tool body 1. A configuration is also possible in which the outer periphery relief face 18 is not provided, and the tip-side outer periphery cutting edge 6 is provided to an intersection ridge between the outer peripheral surface and the rake faces. A configuration is also possible in which the gash face 12 is extended to the tool outer periphery, and a part of the tip side of the tip-side outer periphery cutting edge 6 is provided to the intersection ridge between the gash face 12 and the outer periphery relief face 18 or the outer peripheral surface of the tool body 1.

The tip-side outer periphery cutting edges 6 make it possible to cut, in a satisfactory manner, the hollow hexagonal columnar side surfaces partway down the cells 7 during counterboring, and the end cutting edges 5 improve the cutting surface roughness of the hollow hexagonal columnar cross-section partway down the cells 7.

The number of end cutting edges 5 provided and the number of tip-side outer periphery cutting edges 6 provided are equal (two in the present example). The end cutting edges 5 and the tip-side outer periphery cutting edges 6 are provided in continuation with each other, and are provided at the same phases as each other. The first cutting-chip discharge grooves 2 are provided in continuation with, and at the same phases as, the end cutting edges 5 and the tip-side outer periphery cutting edges 6. Therefore, it is possible for the end cutting edges 5 and the tip-side outer periphery cutting edges 6 to cut a corner simultaneously, improving the performance of cutting a paper honeycomb core 8; and cutting chips cut by the end cutting edges 5 and the tip-side outer periphery cutting edges 6 can be discharged from the first cutting-chip discharge grooves 2 in a smooth manner.

Figure 4:
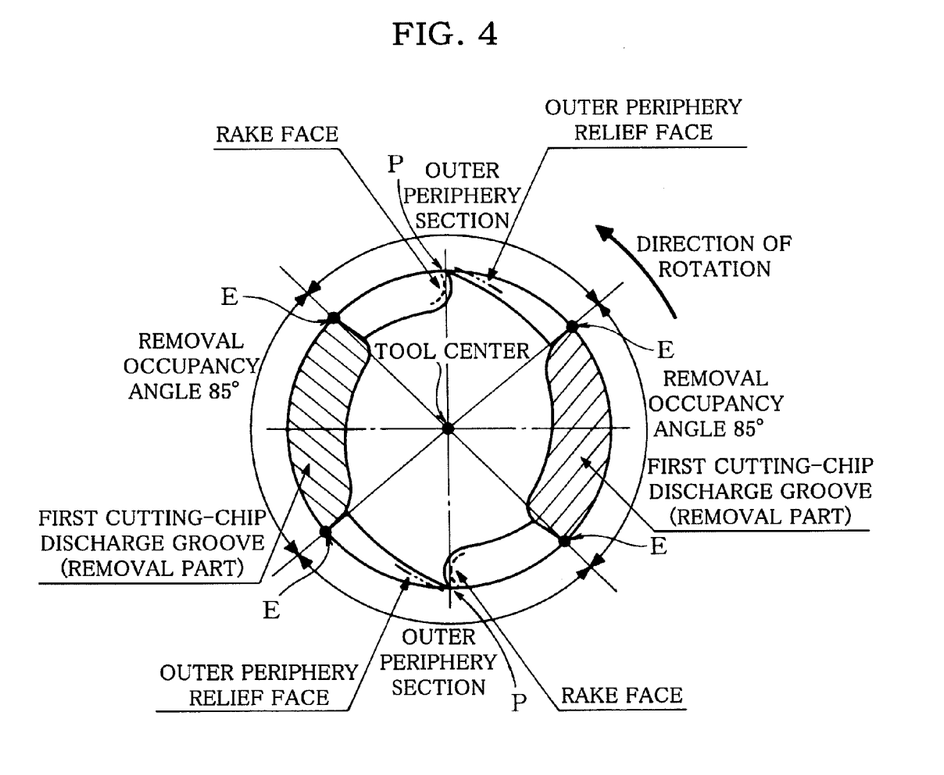
FIG. 4 is a projection of cross-section a-a in FIG. 1 in the direction indicated the by arrows (direction of tool axis)

The occupancy angle (removal occupancy angle) of each of the first cutting-chip discharge grooves 2 in cross-section view perpendicular to the tool axis is set to an angle greater than or equal to 15° and smaller than [360/the number of second cutting-chip discharge grooves 3 present]. Specifically, as shown in FIG. 4, the removal occupancy angle refers to an angle formed between base-end-side outer periphery cutting edges 4 (points E in FIG. 4) positioned at the nearmost positions (tool-tip side) on both end sections of the first cutting-chip discharge grooves 2 (i.e., an angle formed between straight lines passing through the tool center and point E) in cross-section view perpendicular to the tool axis of the tool body 1 (i.e., in a projection, in the tool axis direction, of the cross-section perpendicular to the tool axis). In the present example, the removal occupancy angle is set to 85°. If a predetermined-sized removal occupancy angle is not obtained for the first cutting-chip discharge grooves 2, cutting chips cut by the tip-side outer periphery cutting edges 6 and the base-end-side outer periphery cutting edges 4 are not discharged in a smooth manner, and cutting chips getting caught result in uncut portions and burrs being generated in the material to be cut. If the removal occupancy angle is too large, the number of effective teeth of the base-end-side outer periphery cutting edge is reduced, and the amount of work per cutting edge is increased; as a result, the performance of cutting the fiber-reinforced plastic body and the surface material deteriorates, and burrs occur more readily. In the present specifications, the "number of effective teeth of the base-end-side outer periphery cutting edge 4" refers to the number of base-end-side outer periphery cutting edges 4 present in a given cross-section perpendicular to the tool axis. In the present example, four second cutting-chip discharge grooves 3 forming the base-end-side outer periphery cutting edges 4 are formed. Therefore, in an instance in which no first cutting-chip discharge groove 2 is present (i.e., in an instance in which the occupancy angle in cross-section view perpendicular to the tool axis (removal occupancy angle) is 0°), the number of base-end-side outer periphery cutting edges 4 present in a given cross-section perpendicular to the tool axis is four. The presence of the first cutting-chip discharge grooves 2 removes some of the base-end-side outer periphery cutting edges 4 by an extent corresponding to a predetermined occupancy angle in cross-section view perpendicular to the tool axis (removal occupancy angle). In FIG. 4, the number of effective teeth of the base-end-side outer periphery cutting edges 4 is two, indicated by symbol P.

A description will now be given for the "outer peripheral surface" and the "outer periphery relief face formed on the outer periphery", referred to in relation to forming of the base-end-side outer periphery cutting edges 4. In the example illustrated in FIG. 4, outer periphery relief faces are formed so that no outer peripheral surface (cylindrical surface) is provided to the outer periphery of the tool body, and the base-end-side outer periphery cutting edges 4 are formed on intersection ridges with respect to the rake faces of the second cutting-chip discharge grooves 3 which face the direction of tool rotation. In FIG. 4, points of intersection between the rake faces and the outer periphery relief faces are indicated by label P as the base-end-side outer periphery cutting edges 4. Regions corresponding to the rake face and the outer periphery relief face start at the intersection point (outer periphery cutting edge) between the rake face and the outer periphery relief face; however, the terminal end of each of the rake face and the outer periphery relief face is not necessarily defined, and merely corresponds to the vicinity of the outer periphery cutting edge. Lines are shown in FIG. 4 in order to illustrate the approximate regions corresponding to the rake faces and the outer periphery relief faces. Specifically, the rake face portions are indicated by dashed lines, and the outer periphery relief face portions are indicated by dashed-two dotted lines.

Figure 5:
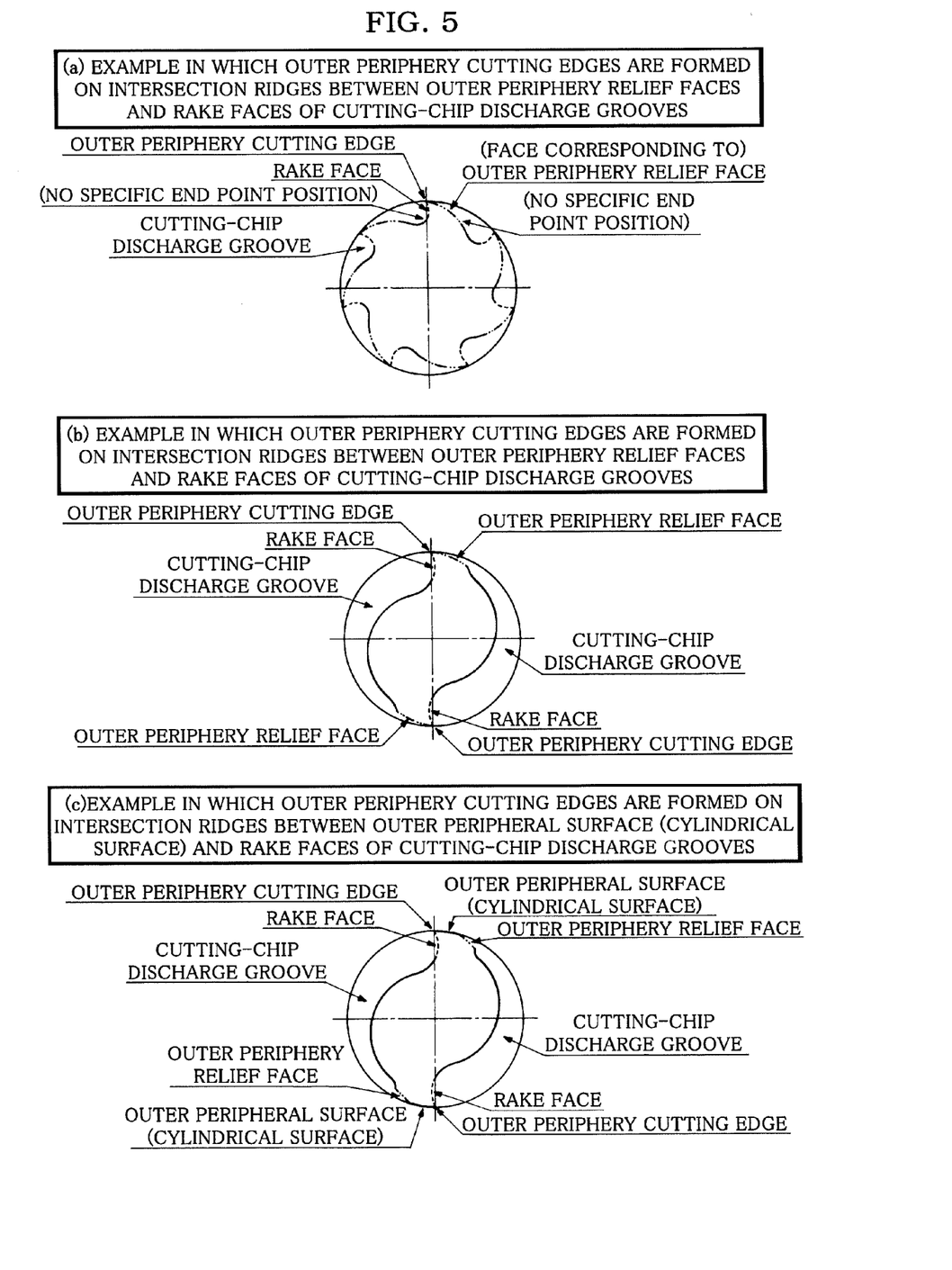
FIG. 5 illustrates other examples with regards to the rake faces of the cutting-chip discharge grooves and the outer peripheral surface or the outer periphery relief faces.

Other examples of outer peripheral surfaces or outer periphery relief faces and rake faces of cutting-chip discharge grooves are shown in FIG. 5. FIG. 5(*a*) is an example in which outer periphery cutting edges are formed on intersection ridges between outer periphery relief faces (dashed-two dotted line portions) and rake faces (dashed line portions) of cutting-chip discharge grooves; and one side of every cutting-chip discharge groove fulfills the role of a rake face, and the other side fulfills the role of an outer periphery relief face (i.e., the other side of every cutting-chip discharge groove is used as the outer periphery relief face, instead of an outer periphery relief face being formed separately from a cutting-chip discharge groove). FIG. 5(b) is an example in which outer periphery cutting edges are formed on intersection ridges between outer periphery relief faces and rake faces of cutting-chip discharge grooves; and the outer periphery relief faces are formed separately from the cutting-chip discharge grooves. FIG. 5(c) is an example in which outer periphery cutting edges are formed on intersection ridges between the rake faces of the cutting-chip discharge grooves and the outer peripheral surfaces (cylindrical surface).

The "outer peripheral surface" and the "outer periphery relief face formed on the outer periphery" in relation to forming of the tip-side outer periphery cutting edges 6 are similarly regarded.

The length of the tip-side outer periphery cutting edges 6 in the axial direction is set between 0.01 mm and three times the tool diameter. In the present example, this length is set to 1.2 mm. The length of the tip-side outer periphery cutting edges 6 in the direction of the tool axis must be [depth of cutting into the material to be cut–(thickness of fiber-reinforced plastic body on one side+thickness of surface material on one side)]. This length is set to a length that does not come into contact with the fiber-reinforced plastic body and the surface material when side-surface counterboring is performed, so as to maintain a satisfactory performance of cutting the hollow hexagonal columnar side surfaces partway down the cells 7 during counterboring. As described further below, the tip-side outer periphery cutting edges 6 spiral leftward at a relatively small spiral angle. Therefore, the fiber-reinforced plastic body itself, in which fiber is arranged in the planar direction of the plate material, can be machined in a satisfactory manner, but burrs are generated during machining of the surface material, which is less hard. The fiber-reinforced plastic body is in intimate contact, without the presence of any gaps, with the surface material (which is provided on the opposite-surface side with respect to the honeycomb core, and is sufficiently thinner than the fiber-reinforced plastic body); therefore, the two members are preferably cut simultaneously, and are preferably cut with the base-end-side outer periphery cutting edges 4 instead of the tip-side outer periphery cutting edges 6. It is necessary to take this into consideration when setting the length of the tip-side outer periphery cutting edges 6 in the axial direction.

The second cutting-chip discharge grooves 3 and the base-end-side outer periphery cutting edges 4 are formed on the outer periphery section, between the first cutting-chip discharge grooves 2, at the base-end side of the tip-side outer periphery cutting edges 6. Therefore, the base-end-side outer periphery cutting edges 4 being absent near the vicinity of the end cutting edge obviates the need to guide cutting chips that have been cut to the bottom surface, making it possible to prevent any decrease in cutting performance at the bottom surface caused by cutting chips getting caught (if the base-end-side outer periphery cutting edges 4 is provided so as to extend to the vicinity of the end cutting edges, the spiral angle of the leftward spiral would be greater; therefore, the cutting chips are guided towards the bottom surface, causing portions of the honeycomb core 8 to remain uncut or the machining surface to be rougher).

Each of the first cutting-chip discharge grooves 2 is provided as a straight line (i.e., a spiral angle ($\alpha$ in FIG. 1) of 0°), or a leftward spiral having a spiral angle ($\alpha$ in FIG. 1) that is smaller than [the spiral angle of the second cutting-chip discharge grooves 3–10°], disposed from the tool tip to the base-end side. The second cutting-chip discharge grooves 3 are provided as a leftward spiral, and the spiral angle ($\beta$ in FIG. 1) of the second cutting-chip discharge grooves 3 is set to at least 50° and less than 90°. A leftward spiral refers to a counterclockwise spiral from the tool tip to the base-end side to the rotational axis of the tool. In the present example, the spiral angle of the first cutting-chip discharge grooves 2 is set to 10°, and the spiral angle of the second cutting-chip discharge grooves 3 is set to 75°. The spiral angle of the first cutting-chip discharge grooves 2 affects the performance of cutting the honeycomb core 8 (paper material) and the performance of discharging cutting chips of the honeycomb core 8, fiber-reinforced plastic body and surface material; and the spiral angle of the second cutting-chip discharge grooves 3 affects prevention of upward burrs in the surface material. In particular, a spiral angle of less than 50° for the second cutting-chip discharge grooves 3 increases the likelihood of upward burrs occurring in the surface material, and is therefore not preferable. The angular ranges mentioned above have been obtained from experience, on the basis of results such as those from an experimental example described further below.

The second cutting-chip discharge grooves 3 are divided by the first cutting-chip discharge grooves 2 and are therefore not provided in a continuous manner. However, each of the second cutting-chip discharge grooves 3 is provided (as an arc) along a predetermined spiral trajectory (spiral trajectory during grinding using grinding wheel); therefore, all of the second cutting-chip discharge grooves 3 provided intermittently along a predetermined spiral trajectory are counted as one groove, and are considered distinct from other second cutting-chip discharge grooves 3 provided intermittently along another spiral trajectory. In the present example, the second cutting-chip discharge grooves 3 are provided in parallel along four different spiral trajectories (i.e., four spiral trajectories having different start points), corresponding to a total of four second cutting-chip discharge grooves 3 being provided. Similarly, with regards to the base-end-side outer periphery cutting edges 4 provided on intersection ridges between the rake faces of the second cutting-chip discharge grooves 3 facing the direction of tool rotation and the outer peripheral surfaces (or the outer periphery relief faces) of the tool body 1, all base-end-side outer periphery cutting edges 4 provided intermittently along a predetermined spiral trajectory are counted as one edge.

The number of teeth of the base-end-side outer periphery cutting edges 4 (i.e., the number of the base-end-side outer periphery cutting edges 4) is configured so as to be greater than the number of teeth of the tip-side outer periphery cutting edges 6. The primary function of the tip-side outer periphery cutting edges 6 is cutting the honeycomb core 8 (paper material). Since the material to be cut is soft, satisfactory cutting performance can be readily obtained even with a small number of teeth, and it is easier to reduce blade-edge wear damage. In contrast, the base-end-side outer periphery cutting edges 4 are primarily used to cut the fiber-reinforced plastic body and the surface material. If the number of teeth is small, the amount of work performed by each tooth will rise, wear damage will increase, and uncut fiber portions and burrs in the surface material will occur more readily. Therefore, it is preferable that a large number of teeth (large number of edges) are provided.

In the present example, four base-end-side outer periphery cutting edges 4 (four second cutting-chip discharge grooves 3) are provided. Therefore, as shown in FIGS. 1 and 2, the base-end-side outer periphery cutting edges 4 are provided close to each other in the direction of the tool axis, making it easier to obtain a sufficiently large number of effective teeth. Specifically, the base-end-side outer periphery cutting edges 4 are provided so that the number of effective teeth at an arbitrary position in the direction of tool axis is no less than [the number of second cutting-chip discharge grooves 3–the number of first cutting-chip discharge grooves 2] (no less than 2 in the present example) (if the number of effective teeth is less than [the number of second cutting-chip discharge grooves 3–the number of first cutting-chip discharge grooves 2], the performance of cutting the fiber-reinforced plastic body will fall).

The base-end-side outer periphery cutting edges 4 and the tip-side outer periphery cutting edges 6 are configured so that the diameter remains substantially uniform from the tip to the base end. This is in order to cater for uniform-diameter machining when a hole is machined, and in order to obtain a uniform cross-section shape during side-surface machining.

Since the present example is configured as described above, when counterboring is applied to a composite honeycomb member obtained by layering CFRP 9 on upper and lower surfaces of a honeycomb core 8 and providing a surface material 10 having a low hardness on surfaces, the tip-side outer periphery cutting edges 6 and the end cutting edges 5 provided to the tool tip can be used to cut, in a satisfactory manner, the cells 7 of the honeycomb core 8 at the bottom surface of the recess; and the base-end-side outer periphery cutting edges 4 provided close to each other along a spiral having a greater spiral angle than that of the first cutting-chip discharge grooves 2 can be used to cut, in a satisfactory manner, the side surface of the recess (CFRP 9 and surface material 10).

Therefore, the present example is one that has excellent utility, in which even when counterboring is applied to a complex honeycomb member, it is possible to obtain a satisfactory cutting state in which burrs and uncut portions are absent in all of the honeycomb core, the fiber-reinforced plastic body, and the surface material.

Experimental examples for corroborating the effect of the present example will now be described.

Figure 6:
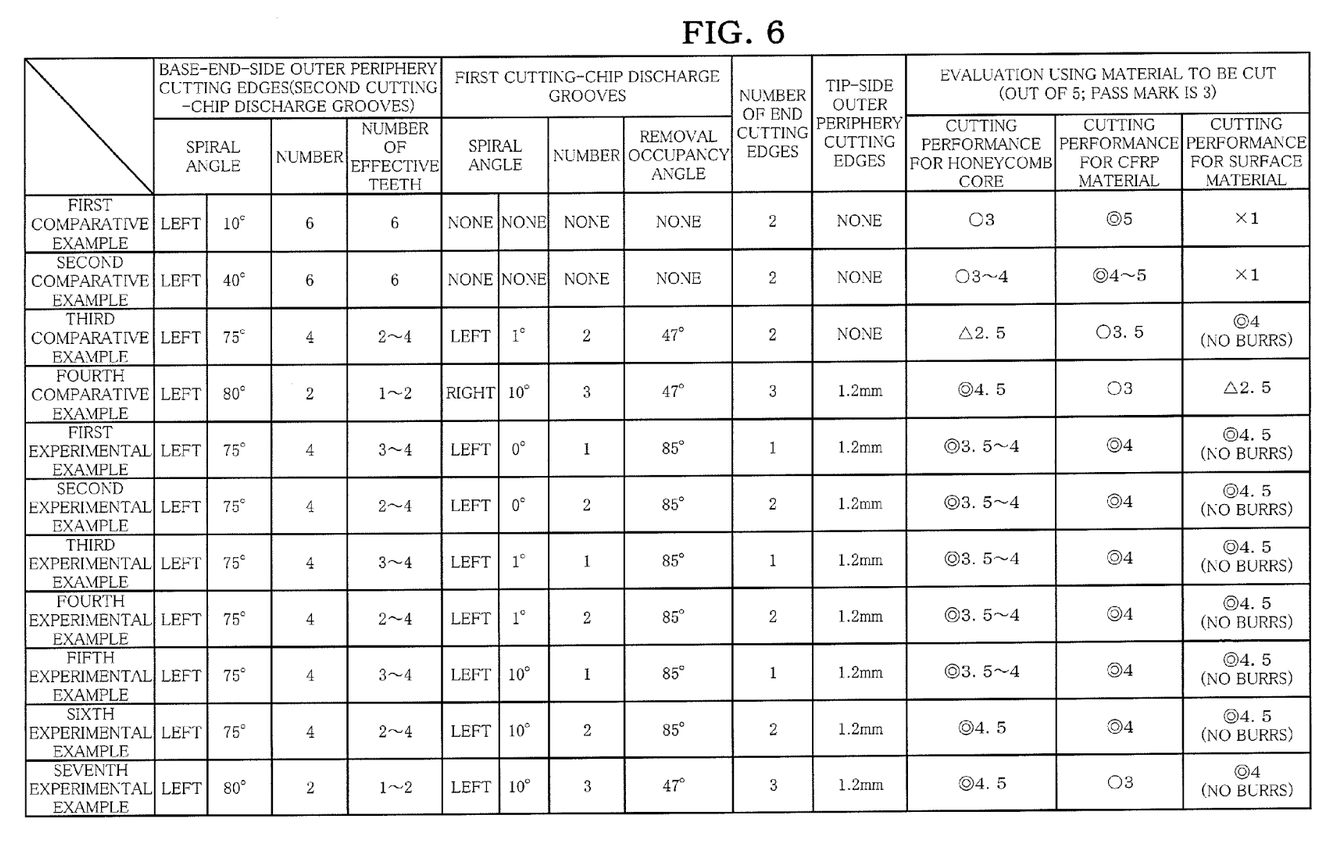
FIG. 6 is a table showing experimental results.

Specifically, tools shown in FIG. 6 were used to apply so-called counterboring to a composite honeycomb member obtained by layering CFRP 9 on upper and lower surfaces of a paper honeycomb core 8, which is a planar assembly of hollow hexagonal columnar cells 7, and further providing a surface material 10 on surfaces of the CFRP 9; and the state of each material after cutting were evaluated.

It can be seen from the results that in first and second comparative examples, in which the first cutting-chip discharge grooves 2 are not provided, there are difficulties with regards to the performance of cutting the surface material. It can also be seen that optimization of the base-end-side outer periphery cutting edges, as in the third comparative example, does not result in an improvement beyond that of the performance of cutting the CFRP and the surface material, and does not enable the performance of cutting the honeycomb core to be optimized; and that providing the tip-side outer periphery cutting edges 6 enables the performance of cutting all materials including the honeycomb core to be optimized. It can also be seen that arranging the first cutting-chip discharge grooves so as to have a rightward spiral results in a deterioration in the performance of cutting the surface material.

It can be seen from the above that the present example configured as described above makes it possible to obtain a satisfactory cutting state in which uncut portions and burrs are absent in all of the materials.

What is claimed is:

1. A rotary cutting tool in which: a first cutting-chip discharge groove disposed from a tool tip towards a base-end side is formed on an outer periphery of a tool body; a plurality of second cutting-chip discharge grooves, provided along a spiral disposed from the tool tip towards the base-end side so as to intersect with the first cutting-chip discharge groove, are formed on an outer periphery section of the tool body where the first cutting-chip discharge groove is absent; a base-end-side outer periphery cutting edge is formed on an intersection ridge between a rake face of a second cutting-chip discharge groove, which faces a direction of tool rotation, and an outer peripheral surface of the tool body or an outer peripheral relief face formed on the outer periphery of the tool body; wherein an end cutting edge is provided at a tip section of the tool body; a tip-side outer periphery cutting edge is formed on an intersection ridge between the rake face at a tip section of the first cutting-chip discharge groove and an outer peripheral surface of the tip of the tool body or an outer periphery relief face formed on an outer periphery of the tip of the tool body; and the base-end-side outer periphery cutting edge is provided further towards the tool base-end side than the tip-side outer periphery cutting edge.

2. The rotary cutting tool according to claim 1, characterized in that:
   the first cutting-chip discharge groove is provided as a straight line, or a leftward spiral having a spiral angle that is smaller than [the spiral angle of the second cutting-chip discharge grooves–10°], disposed from the tool tip to the base-end side;
   the second cutting-chip discharge grooves are provided as a leftward spiral; and
   the spiral angle of the second cutting-chip discharge grooves is set to at least 50° and less than 90°.

3. The rotary cutting tool according to claim 1, characterized in that the base-end-side outer periphery cutting edge and the tip-side outer periphery cutting edge have a substantially uniform diameter from the tip to the base end.

4. The rotary cutting tool according to claim 2, characterized in that the base-end-side outer periphery cutting edge and the tip-side outer periphery cutting edge have a substantially uniform diameter from the tip to the base end.

5. The rotary cutting tool according to claim 4, characterized in that:
   the occupancy angle of the first cutting-chip discharge groove in cross-section perpendicular to a tool axis is equal to or greater than 15° and smaller than [360/the number of second cutting-chip discharge grooves present]; and
   the base-end-side outer periphery cutting edge is provided so that the number of effective teeth at an arbitrary point in a direction of tool axis is no less than [the number of the second cutting-chip discharge grooves–the number of the first cutting-chip discharge groove].

6. The rotary cutting tool according to claim 5, characterized in that the end cutting edge and the tip-side outer periphery cutting edge are provided in equal numbers, and each of the end cutting edge and the tip-side outer periphery cutting edge is provided in continuation.

7. The rotary cutting tool according to claim 6, characterized in that the first-cutting-chip discharge groove is provided in continuation with the end cutting edge and the tip-side outer periphery cutting edge.

8. The rotary cutting tool according to claim 6, characterized in that the base-end-side outer periphery cutting edge is provided so that the number of effective teeth at an arbitrary point in the direction of tool axis is no less than [the number of the second cutting-chip discharge grooves–the number of the first cutting-chip discharge groove].

9. The rotary cutting tool according to claim 7, characterized in that the base-end-side outer periphery cutting edge is provided so that the number of effective teeth at an arbitrary point in the direction of tool axis is no less than [the number of the second cutting-chip discharge grooves–the number of the first cutting-chip discharge groove].

10. The rotary cutting tool according to claim 1, characterized in that the number of the base-end-side outer periphery cutting edges is greater than the number of the tip-side outer periphery cutting edges.

11. The rotary cutting tool according to claim 5, characterized in that the number of the base-end-side outer periphery cutting edges is greater than the number of the tip-side outer periphery cutting edges.

12. The rotary cutting tool according to claim 6, characterized in that the number of the base-end-side outer periphery cutting edges is greater than the number of the tip-side outer periphery cutting edges.

13. The rotary cutting tool according to claim 7, characterized in that the number of the base-end-side outer periphery cutting edges is greater than the number of the tip-side outer periphery cutting edges.

14. The rotary cutting tool according to claim 8, characterized in that the number of the base-end-side outer periphery cutting edges is greater than the number of the tip-side outer periphery cutting edges.

15. The rotary cutting tool according to claim 9, characterized in that the number of the base-end-side outer periphery cutting edges is greater than the number of the tip-side outer periphery cutting edges.

16. The rotary cutting tool according to claim 2, characterized in that the number of the base-end-side outer periphery cutting edges is greater than the number of the tip-side outer periphery cutting edges.

17. The rotary cutting tool according to claim 3, characterized in that the number of the base-end-side outer periphery cutting edges is greater than the number of the tip-side outer periphery cutting edges.

18. The rotary cutting tool according to claim 4, characterized in that the number of the base-end-side outer periphery cutting edges is greater than the number of the tip-side outer periphery cutting edges.

* * * * *